(12) United States Patent
McGrew et al.

(10) Patent No.: US 6,935,664 B2
(45) Date of Patent: Aug. 30, 2005

(54) FIFTH WHEEL RELEASE TOOL

(76) Inventors: David L. McGrew, 200 S. Radnor Chester Rd., Villanova, PA (US) 19085; Jim Himler, 220 Yorktown Ct., Malvern, PA (US) 19355; Jeff Burr, 2218 Wideview Dr., Covington, KY (US) 41011

( * ) Notice: Subject to any disclaimer, the term of this patent is extended or adjusted under 35 U.S.C. 154(b) by 0 days.

(21) Appl. No.: 10/700,682

(22) Filed: Nov. 5, 2003

(65) Prior Publication Data

US 2005/0093314 A1    May 5, 2005

(51) Int. Cl.$^7$ ............................. B65G 7/12; B62D 53/06
(52) U.S. Cl. ........................................ 294/26; 280/433
(58) Field of Search .................... 294/19.1, 26; 54/49, 54/46, 47; 280/433, 434, 149.2; 254/129, 254/131, 113

(56) References Cited

U.S. PATENT DOCUMENTS

| | | | |
|---|---|---|---|
| 4,251,089 A | * | 2/1981 | Skaggs ........................ 280/433 |
| 4,878,653 A | * | 11/1989 | Brown ............... 254/134.3 FT |
| 5,201,559 A | | 4/1993 | Boring et al. |
| 5,344,201 A | | 9/1994 | Offin |
| 5,378,007 A | | 1/1995 | Joyce |
| 5,423,567 A | * | 6/1995 | Upton ........................ 280/433 |
| 5,626,063 A | | 5/1997 | Kosbab |
| 5,863,060 A | | 1/1999 | Hollis et al. |
| 5,882,027 A | | 3/1999 | Tevis |
| 6,201,252 B1 | | 3/2001 | Hollis et al. |
| 6,282,872 B1 | * | 9/2001 | Schulte .......................... 54/49 |
| 6,354,642 B1 | | 3/2002 | Haggerty |
| 2003/0127826 A1 | | 7/2003 | Clemence |

FOREIGN PATENT DOCUMENTS

GB    2160163    * 12/1985

* cited by examiner

*Primary Examiner*—Kathy Matecki
*Assistant Examiner*—Esther Okezie
(74) *Attorney, Agent, or Firm*—Richard C. Litman

(57) ABSTRACT

The fifth wheel release tool is a device for applying the required force for releasing the latch mechanism of the fifth wheel hitch securing a semi-trailer to a truck tractor. The release tool has a hook which is removably secured to the hitch release handle, a non-resilient line extending from the hook, a treadle or stirrup secured to the opposite end of the line from the hook, and a saddle which is removably secured to a relatively fixed structure and over or through which the flexible line runs. This assembly transfers the tensile force applied to the release handle from the horizontal to the vertical as the flexible line passes over the saddle component. A person using the present release tool need only apply one's weight to the treadle or stirrup, in order to apply sufficient force to release even a relatively sticky hitch release.

19 Claims, 5 Drawing Sheets

FIFTH WHEEL RELEASE TOOL

BACKGROUND OF THE INVENTION

1. Field of the Invention

The present invention relates generally to tools adapted for applying the tensile force required to release the fifth wheel latch on a tractor and semi-trailer assembly. More specifically, the present invention comprises a release tool which alters the direction of the applied force from the horizontal to a substantially vertical orientation, whereby the person using the present tool can use his or her body weight to apply the release force, merely by stepping on a treadle provided with the tool.

2. Description of the Related Art

Large and/or heavy loads are conventionally carried over the road by truck tractor and semi-trailer units, in which the tractor provides the support for the forward end of the trailer. The trailer includes a hitch or "king" pin extending downwardly from its forward end, which engages a so-called "fifth wheel" disposed generally horizontally on the back of the truck tractor, behind the cab. The connection of the trailer to the tractor is essentially automatic, as the latch is spring loaded to a closed position and engages the king pin of the trailer when the tractor is backed into position for the fifth wheel plate and latch to engage the king pin of the trailer.

Release of the trailer from the tractor, however, requires specific action on the part of the trucker. The trucker must support the forward end of the trailer and manipulate a handle extending from the fifth wheel release, and apply sufficient tensile force to open the release in order to allow the tractor to be driven away from the trailer. Oftentimes, the king pin binds in the fifth wheel, due to the tractor and trailer being parked on slightly different lateral grades or slopes, or perhaps excessive dirt or other foreign matter contaminating the release mechanism, etc. At best, a considerable amount of force is required to overcome the spring tension which holds the release mechanism in its normally closed position. When other factors result in even greater release force being required, the necessary force can tax the strength of even the strongest trucker.

As a result, a number of fifth wheel release tools have been developed over the years. Many such tools are adapted to serve multiple purposes, e.g. serve as a fifth wheel release tool as well as a tool for pulling the locking pins securing the rearward tandem axles of the trailer, to provide for their positional adjustment. As a result, most such tools are not adapted to provide any real leverage or mechanical advantage for use as a fifth wheel release tool. Other fifth wheel release tools have been configured as levers, to provide additional mechanical advantage to the user. However, all of these tools of which the present inventors are aware, require arm and upper back exertion by the person using the tool.

The upper back exertion required in using conventional fifth wheel release tools can frequently result in some form of back injury to the trucker, e.g. a back sprain, pulled muscle, etc. Such injuries can be extremely painful at best, and may be completely incapacitating to the trucker. In fact, OSHA has found that the activity of releasing the fifth wheel of a tractor-trailer combination is among the top three causes of injuries to truckers.

Accordingly, a need will be seen for a fifth wheel release tool which does not require any significant upper back strength or exertion on the part of a user of the tool. The present fifth wheel release tool in its various embodiments serves to change the direction of the applied tensile force on the fifth wheel release handle from essentially horizontal, to an essentially vertical orientation. The present release tool includes a treadle or stirrup which is positioned near but somewhat above the underlying surface, into which the trucker may place his or her foot. The trucker need only stand in the stirrup to apply all of his or her weight to the release, thereby quickly and easily releasing all but the most stubborn fifth wheel releases. The present release tool enables the user to apply considerably more force than is available with conventional tools, particularly those tools which do not provide any mechanical advantage for the arm and upper back strength of the user.

A discussion of the related art of which the present inventors are aware, and its differences and distinctions from the present invention, is provided below.

U.S. Pat. No. 4,251,089 issued on Feb. 17, 1981 to Michael G. Skaggs, titled "Tractor-Trailer Vehicle Decoupling Tool," describes a fifth wheel hitch release tool comprising a lever bar with a latch release engaging rod extending therefrom. The lever bar has a handle end and an opposite fulcrum end, with the latch release rod connected closer to the fulcrum end of the lever bar. The tool is used by hooking the engaging rod on the fifth wheel release handle, and placing the fulcrum end of the lever bar against the side of an outer tire. The longer handle end is then pulled outwardly to provide a mechanical advantage in the application of force to the release handle. While this tool may facilitate the release of a sticky or stubborn fifth wheel latch, it does so using only the upper body strength of the user. No transfer of force from the horizontal to the vertical or utilization of the user's weight is provided by the Skaggs tool.

U.S. Pat. No. 5,201,559 issued on Apr. 13, 1993 to Russell W. Boring et al., titled "King Pin Release Tool," describes a tool which uses the slide hammer principle. The Boring et al. tool has two concentric, telescoping shafts, with the shafts initially retracted upon connection to the fifth wheel latch release handle. The second shaft is then sharply extended, with its mass providing a sudden force to the first shaft connected to the release handle, to jerk the release handle and latch open. This tool requires significant upper body strength for operation, and does not provide any means of transferring the required force to the vertical to allow the trucker to merely step on the distal end of the tool to apply the required force.

U.S. Pat. No. 5,344,201 issued on Sep. 6, 1994 to A. Dean Offin, titled "Multi-Function Tool For Truck Operators," describes a tool comprising a bar with a release handle engaging hook on the distal end, and a handle extending at a right angle from the opposite end of the bar. The tool is used by applying a release force straight out from the hitch release handle, which requires significant upper back exertion from the trucker using the tool. The injury potential when using such a tool has been noted further above. In contrast, the present tool transfers the force required from a substantially horizontal direction to a substantially vertical direction, allowing the trucker to use his or her body weight to apply the force required for hitch release.

U.S. Pat. No. 5,378,007 issued on Jan. 3, 1995 to Ronald W. Joyce, titled "Trailer Hitch Uncoupling Apparatus And Method Of Use," describes a combination tool for use in releasing a fifth wheel hitch, as well as in releasing the slider locking pins for adjusting the position of the rear wheels on a semi-trailer. When used to release the fifth wheel latch, the tool is configured as a lever with the fulcrum between the release handle engaging rod and the opposite handle end of the lever arm. The fulcrum is placed against the side of the trailer and force is applied to the handle end of the lever arm toward the trailer, thereby pulling the opposite end with its release handle rod, outwardly. The Joyce tool also requires significant upper body exertion, with the only difference between this tool and other lever type tools being that the applied force is directed toward the trailer, rather than away from the trailer.

U.S. Pat. No. 5,423,567 issued on Jun. 13, 1995 to Bobby R. Upton, titled "Tractor Trailer Fifth Wheel Lever/Cable Assembly," describes a lever type tool comprising a bar having a fulcrum at one end and handle at the opposite end. A release handle pull cable extends from the general center area of the bar. The fulcrum is placed against the side of the trailer and an outward force is applied to the handle end of the bar, to apply a release force to the fifth wheel latch release handle. The Upton tool thus more closely resembles the tool of the Skaggs '089 U.S. Patent, discussed further above, than it does the present invention with its provision for the utilization of downward force provided by the body weight of the user for releasing the fifth wheel latch.

U.S. Pat. No. 5,626,063 issued on May 6, 1997 to Delbert D. Kosbab, titled "Tool For Unlocking A Fifth Wheel Locking Handle," describes a device comprising an elongate bar with a T-shaped handle at one end and an offset catch at the opposite end. The catch is configured to capture the release handle of a fifth wheel hitch, and rotate the handle from its locked position to allow it to be pulled to release the hitch. The tool may also be used to apply the tensile force on the handle to release the hitch latch, but no leverage or amplification of force is provided by the Kosbab tool; all force must come from the upper body and back of the person using the tool. The present tool, with its change of direction of the required release force from the horizontal to the vertical, allows the body weight of the user to be used, thus avoiding the need for upper back exertion.

U.S. Pat. No. 5,863,060 issued on Jan. 26, 1999 to William E. Hollis et al., titled "Fifth Wheel King Pin Release Mechanism," describes a permanently installed device which is a part of the hitch and release assembly of the truck. The device comprises a lever arm which is permanently installed to a fulcrum pivot at the fifth wheel plate, with a distal handle at the opposite end. The fifth wheel release handle is linked to the lever arm at an intermediate point thereon. Applying an outward force on the lever arm applies an amplified force to the release handle by means of the leverage provided. However, due to the generally outward and horizontal force applied, the Hollis et al. mechanism is more closely related to the portable devices of the Skaggs '089, Joyce '007, and Upton 567 U.S. Patents, discussed further above, than it is to the present invention with its downwardly applied force by means of the body weight of the user.

U.S. Pat. No. 5,882,027 issued on Mar. 16, 1999 to Steven A. Tevis, titled "Fifth Wheel Trailer Hitching Tool And Apparatus," describes a tool for use with fifth wheel mechanisms for lighter semi-trailers generally towed by heavier pickup trucks having ball type hitches installed in their beds. The basic principle of the hitch release tool remains essentially the same as that described further above for tools used with truck tractor and semi-trailer fifth wheel hitches, however. Several embodiments are described by Tevis, but none facilitate the release of the hitch by the application of body weight to produce a downwardly oriented force to release the latch of the hitch mechanism.

U.S. Pat. No. 6,201,252 issued on Mar. 13, 2001 to William E. Hollis et al., titled "Fifth Wheel King Pin Release Mechanism," appears to be related to the '060 U.S. Patent to the same inventors, discussed further above. The primary difference appears to be provision for holding the release handle in a fully opened, release position. However, the release handle mechanism of the '252 U.S. Patent is essentially the same as that of the '060 U.S. Patent to the same inventors, discussed further above, and the points of difference noted in the discussion of that device and the present invention are seen to apply here as well.

U.S. Pat. No. 6,354,642 issued on Mar. 12, 2002 to Scotty E. Haggerty, titled "Puller And Locator For Trailer Tandem Axle Units," describes a multipurpose tool also useful in pulling the release handle of a fifth wheel hitch mechanism. The device comprises a telescoping rod and tension spring, with the spring applying force to release the slider locking pins of the tandem axle assembly of a semi-trailer. A hook is provided at the distal end of the assembly, for engaging the release handle of a fifth wheel hitch. The Haggerty tool is quite versatile, but its function as a fifth wheel release tool is limited due to the other functions of the device. Force for releasing the fifth wheel latch must be applied horizontally and outwardly with a straight pull on the Haggerty tool, thus requiring exertion of the muscles of the upper body and back. The present tool, with its downwardly disposed treadle or stirrup, provides the release force merely by the user stepping into the stirrup and applying his or her body weight to accomplish the task.

U.S. Patent Publication No. 2003/127,826 published on Jul. 10, 2003 to Dale Clemence, titled "Method And Device For Releasing A Fifth Wheel Hitch," describes a device comprising a fifth wheel release handle hook linked by a chain to a transverse handle. The device is used by positioning the hook so that it is offset from the direction of the handle, and providing some slack in the chain. The handle is then jerked outwardly to pull the assembly taut, with the momentum applying a sudden high force to the hitch release handle. The Clemence device is thus more closely related to the slide hammer type hitch release tool of the Boring et al. '559 U.S. Patent, discussed further above, than it is to the present invention with its downwardly directed release force.

Finally, British Patent Publication No. 2,160,163 published on Dec. 18, 1985 to York Technical Services Ltd., titled "Fifth-Wheel Trailer Coupling," describes a relatively complex fifth wheel latch and release mechanism which is installed as a permanent subassembly of the fifth wheel mechanism of a truck tractor. Various means for temporarily holding the mechanism, and release handle, in either the released or latched position are disclosed. However, no additional tools to facilitate the application of the required force to the release handle are disclosed by Bloomfield.

None of the above inventions and patents, taken either singly or in combination, is seen to describe the instant invention as claimed. Thus a fifth wheel release tool solving the aforementioned problems is desired.

SUMMARY OF THE INVENTION

The fifth wheel release tool comprises a hook for temporarily securing to the release handle, a non-resilient line extending from the hook, and a treadle or stirrup extending from the line opposite the hook. A saddle or the like is located generally medially along the flexible line, for removable placement atop a tire or other relatively fixed structure. The line extends generally horizontally from the hitch release handle to the saddle, then changes direction to hang downwardly to the treadle, which is suspended just above the underlying surface.

The above-described tool serves to apply the required tensile force for releasing the latch of the fifth wheel hitch, merely by stepping in the stirrup or treadle and applying one's body weight to the cable or line by means of the stirrup. Even a relatively light person is likely capable of applying over one hundred pounds of force to the release mechanism by means of the present tool, thus greatly facilitating the actuation of the release in a fifth wheel hitch mechanism. The present release tool does not require any exertion of the upper body or back other than that required when performing an activity such as stepping upwardly onto one of a set of steps, and the maintenance of balance by holding the tire, trailer, or other structure while using the tool. Thus, the present release tool will greatly reduce or eliminate back injuries which occur to truckers straining to operate release mechanisms using conventional fifth wheel hitch release tools.

The present fifth wheel hitch release tool invention contains a number of different embodiments, with the line comprising cable, chain, or even multiple rods or any other non-resilient material. The saddle may be placed upon one of the outer tires of the truck tractor, or upon another structure spanning the outboard forward and rearward tires of the rear wheel assembly of the tractor. The saddle may comprise any of a number of different forms, and may include pulleys, guides, bellcranks, and/or other mechanisms as desired to transfer the direction of force applied by the cable or line.

Accordingly, it is a principal object of the invention to provide a fifth wheel release tool which transfers the direction of the forces applied from the horizontal to the vertical, thereby greatly reducing back strain for a user of the tool.

It is another object of the invention to provide such a tool comprising a release handle engaging hook, a non-resilient line, a stirrup or the like attached to the line opposite the release handle hook, and a saddle disposed medially along the line for placement upon a tire or other structure, for changing the direction of the force applied using the tool.

It is a further object of the invention to provide such a tool in which the flexible line may comprise a cable, chain, plural lengths of rod, or non-resilient length of material.

Still another object of the invention is to provide such a tool in which the saddle may be formed of rigid or non-rigid materials, and which may include a pulley, bellcrank, or other means for changing the direction of force applied by the line.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises a series of embodiments of a tool for actuating the release handle of a "fifth wheel" type trailer hitch of a truck tractor. Oftentimes, the force required to open the release to free the trailer from the tractor can be quite high. Conventional release tools all require the use of upper body and back muscles, which can lead to various back injuries. In fact, excessive exertion of the upper body and back while actuating the fifth wheel hitch release lever is the third most common cause of injuries to truckers, according to OSHA.

The present invention provides a solution to this problem by means of various embodiments of a tool which changes the direction of the applied force from a generally horizontal direction to a downward, generally vertical direction, with the user of the device needing only to step upon the foot actuator of the device to apply his or her body weight to the release mechanism. This provides more than sufficient force to actuate even the most stubborn releases, with nothing more than a small step being required of the user of the present invention.

Figure 1:
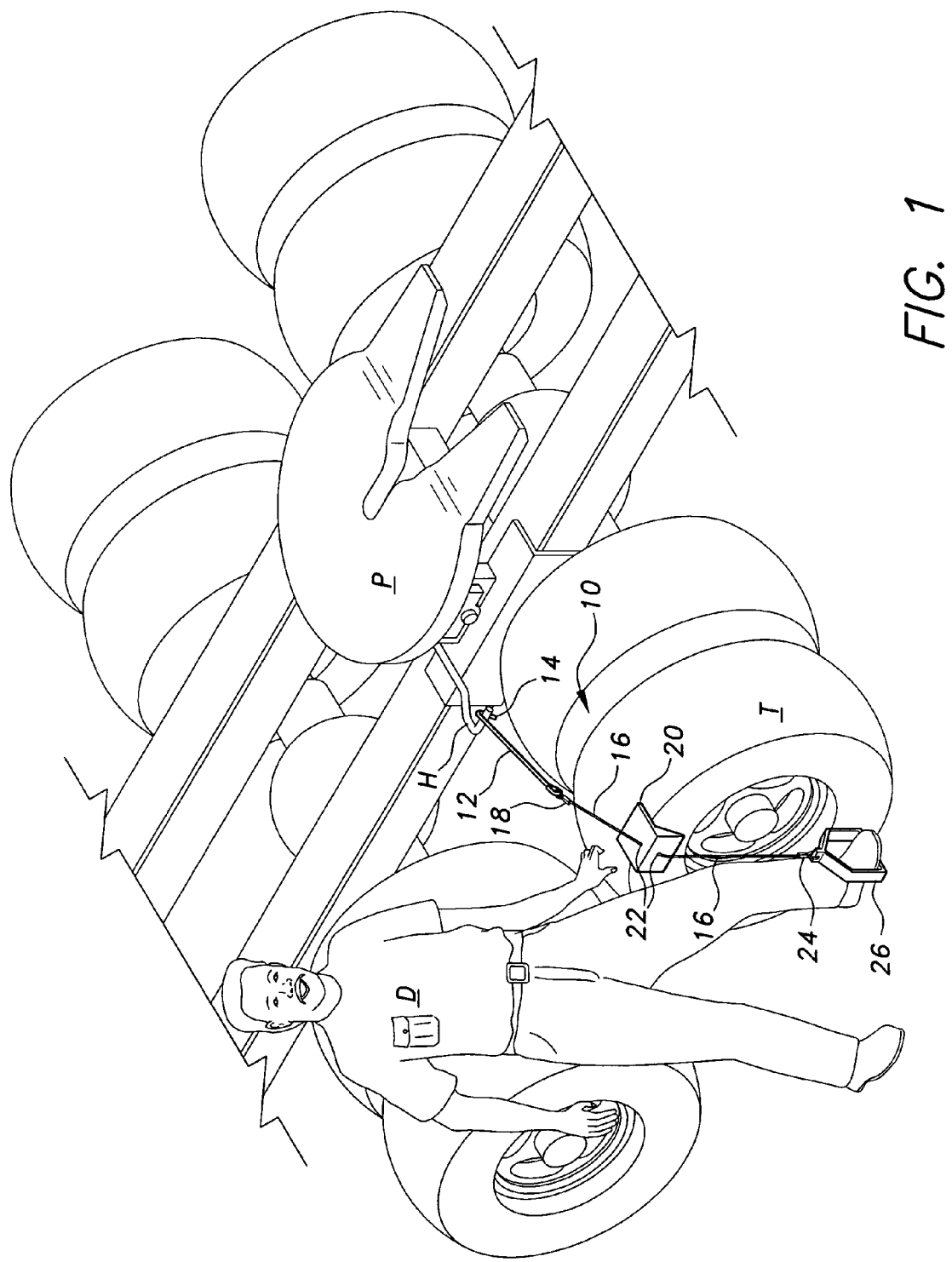
FIG. 1 is a perspective view of the rear portion of a truck tractor with the trailer omitted for clarity, showing placement and use of the present fifth wheel release tool thereon.

FIG. 1 is an environmental perspective view of the tool 10 removably placed upon the rear of a truck tractor, showing its operation. Normally a trailer would be connected to the fifth wheel hitch of the tractor, with the trucker actuating the hitch release in order to release the trailer from the tractor. However, the trailer has been omitted in FIG. 1, to more clearly show the installation of the invention on the tractor.

The truck tractor includes a conventional fifth wheel hitch plate P, with a hitch release handle H extending therefrom. Conventional latch mechanisms require that the handle H be pulled outwardly, i.e. away from the hitch plate P, in order to open the hitch and release the king pin of the trailer therefrom. Accordingly, the present invention includes a pull rod 12 or the like having a hitch release engaging hook 14 extending from the distal end thereof. The hook 14 is temporarily and removably hooked to the hitch release handle H, and extended outwardly therefrom to deploy the present fifth wheel release tool 10.

A flexible, non-resilient line 16 (e.g. cable, etc.) has a first end 18 which is connected to the pull rod 12, opposite the hook end 14. The first end 18 of the line or cable 16 may use any suitable means for securing to the pull rod 12, e.g. a loop installed around an eye formed in the end of the pull rod and secured with cable clamps, Nicopress® sleeves, etc., as desired. Some form of line length adjustment may be incorporated if so desired, e.g. one or more conventional openable chain links or the like, which may be added or removed to increase or decrease the length of the cable 16 as desired. Alternatively, the entire line may be formed of chain, with one or more openable links provided therein as desired. The tool embodiment illustrated in FIG. 2 of the drawings and discussed further below shows a chain being used for the flexible line, but it will be understood that such a chain may be incorporated with any of the various embodiments of the present fifth wheel release tool, as desired.

The line 16 extends generally horizontally from the release pull rod 12, to pass through or over a saddle 20 which serves to change the direction of the line 16 from horizontal to a downwardly oriented, generally vertical direction. The saddle 20 may be in any of a number of different forms or configurations, as desired. The saddle 20 of FIG. 1 is a rigid aluminum bracket having a generally L-shaped cross section, with one side or leg tapering in thickness to define an obtuse interior angle between the two legs. This configuration is well suited to fit over the sidewall and tread of a truck tire T, generally as shown in FIG. 1. However, the saddle 20 may be placed along the edge of any suitable relatively stationary structure, as desired.

The saddle 20 also includes a line guide 22 thereon, comprising a hole or passage formed through the common edge defined by the two legs of the bracket. The line guide 22 may comprise a hole or tube, or perhaps a channel formed in the outer surface or edge of the saddle, or other structure, some examples of which are illustrated in other drawing Figs. and described further below. The specific configuration of the line guide 22 is not critical, so long as the guide 22 retains the flexible line 16 on or across the saddle 20, and allows the line 16 to move as required for the function of the present tool 10. The saddle is disposed generally medially along the flexible line 16, with the line guide 22 serving to prevent the line from slipping laterally to one side or the other of the saddle 20 while still allowing the line 16 to move across the saddle 20 in a path defined by the line guide 22.

The line 16 drops vertically downwardly after passing through the line guide 22 of the saddle 20, with the second end 24 of the line 16 having a foot actuator 26 (stirrup, loop, step rod or pipe, etc.) suspended therefrom. In the embodiment of FIG. 1, the foot actuator 26 comprises a stirrup formed of a sturdy, rigid aluminum casting. An attachment ear or lug extends from the upper portion of the stirrup 26, to which the second end 24 of the line 16 is secured by any suitable means, e.g. the loop and Nicopress® attachment used for attaching the first end 18 of the line 16 to the pull rod 12, etc.

The present hitch release tool 10 is used generally as depicted in FIG. 1 of the drawings. As noted further above, normally a trailer would be secured to the truck tractor on the hitch plate P, but the trailer is not shown in FIG. 1 in order to show the installation and use of the present invention without any of the elements being obscured. The pull rod 12 is extended toward the hitch plate P of the truck tractor, and the hitch release engaging hook 14 of the rod 12 is temporarily secured to the hitch release handle H of the hitch mechanism. The cable or line 16 is extended outwardly from the pull rod 12, with the saddle 20 placed over the outer edge of an outer tire T of the truck, or over some other relatively fixed structure as appropriate. The remainder of the cable or line 16, with the stirrup or foot actuator 26 suspended from its second end 24, hangs freely above the underlying surface, with the line 16 providing sufficient length to hold the bottom of the stirrup or foot actuator 26 a few inches above the underlying surface.

At this point, the trucker or driver D need only place one foot onto the foot actuator or into the stirrup 26, and step down. The weight of the driver D produces a downward tensile force along the lower portion of the line or cable 16 extending from the saddle 20, with the saddle 20 changing the direction of the line 16 and its tensile force from the vertical to the horizontal as the line 16 passes through the line guide 22 to its connection to the pull rod 12. The pull on the line 16 results in the line 16 pulling the pull rod 12 outwardly, i.e. away from the hitch plate P and toward the outer tire T and driver D, with this motion resulting in the hitch release handle H also being pulled outwardly to release the hitch mechanism. It will be seen that even the lightest of drivers is capable of producing over one hundred pounds of force to release a stuck or stiff fifth wheel hitch mechanism, with no appreciable exertion of the muscles of the upper body or back being required, when the driver D places all of his or her weight on the foot actuator or stirrup 26.

Figure 2:
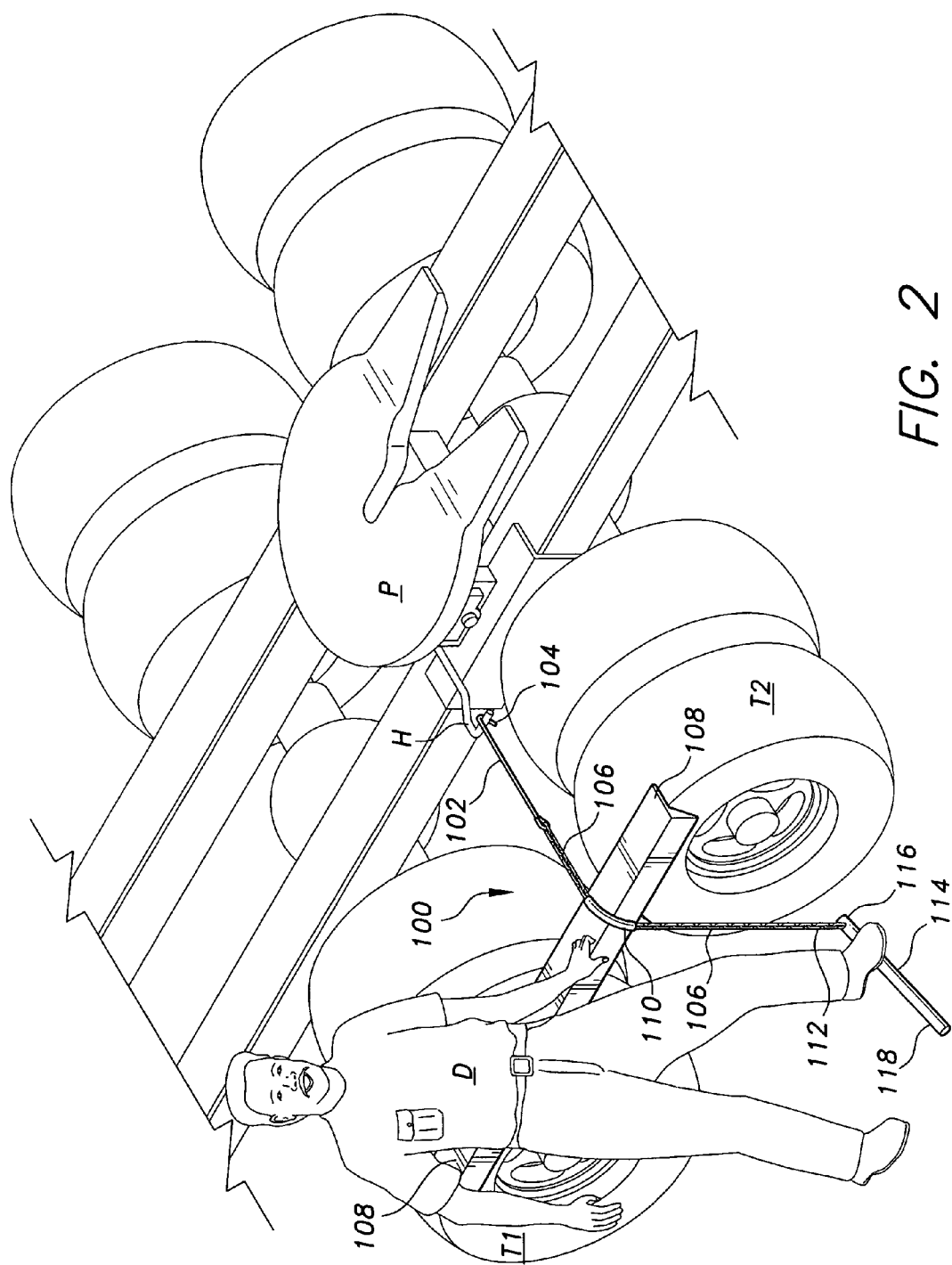
FIG. 2 is a perspective view of an alternate embodiment of the present fifth wheel release tool, showing its application to the rear wheels of a truck tractor and its operation and use.

FIG. 2 of the drawings is an environmental perspective view of a second embodiment of the present fifth wheel hitch release tool, designated as tool 100 in FIG. 2. The tool 100 provides exactly the same function as the tool 10 of FIG. 1, but differs in its structural elements. The tool 100 includes a pull rod 102 with its hitch release engaging hook 104, essentially identical to those components 12 and 14 of the tool 10 illustrated in FIG. 1. The trailer is again not shown in FIG. 2 for clarity.

However, rather than using a cable or the like as the tension line of the device, a chain 106 is provided. The use of a non-resilient cable is preferred, due to its lighter weight and other advantages. However, a chain 106 (e.g. closed loop, welded link chain, wrapped link chain, double loop coil chain, etc.), or other flexible, non-resilient element (e.g., the cable 16 of the tool 10 of FIG. 1) may be used if so desired.

Rather than using a saddle element to control the position of the line 106, the tool 100 utilizes an elongate crossmember 108 with a line guide 110 secured thereto. The crossmember 108 may have an L-shaped cross section as shown to conform generally to the outer edges of the tires T1 and T2, or other shape as desired. The medial portion of the line 106 passes through the guide 110 and changes from a generally horizontal to a vertical direction when the tool 100 is deployed, just as in the tool 10 of FIG. 1. However, the crossmember 108 has a span sufficient to extend across the forward and rearward outer tires T1 and T2 in a tandem axle truck tractor, and may provide superior positioning of the line guide 110 and line 106 passing therethrough where the hitch release handle H is most easily accessed between the forward and rearward tires of the tandem axle assembly. Otherwise, the saddle 20 of the tool 10 of FIG. 1, or other similar element, may be placed atop one of the tires T1 or T2, with the friction between the tire and the saddle element being sufficient to hold the saddle in place even though the line 16 or chain 106 may be oriented slightly forwardly or rearwardly between the hitch release handle and the position of the saddle.

The second end 112 of the chain or line 106 is connected to a foot actuator 114, just as in the tool 10 of FIG. 1. However, the foot actuator 114 of the hitch release tool 100 has a considerably different configuration than the stirrup 26 of the tool 10 of FIG. 1. In FIG. 2, a length of rigid pipe or rod 114 is used for the foot actuator element, with an attachment end 116 of the pipe or rod 114 being secured (e.g. welded chain link, shackle or U-bolt bolted to the end, etc.) to the second end 112 of the chain or line 106 and suspended above the underlying surface, and the opposite free end 118 resting upon the surface.

The hitch release tool 100 of FIG. 2 is used in essentially the same manner as that described further above for the operation of the tool 10 of FIG. 1. The pull rod 102 is hooked to the hitch release handle H, and the crossmember 108 is placed across the two outboard tandem tires T1 and T2, or across another relatively fixed structure as desired. The chain or line 106 runs through the line guide, i.e. the tube 110 affixed to the crossmember 108, and continues downwardly to its connection to the foot actuator 114. The driver D need only step upon the pipe or rod 114 to apply a downward force to its attachment end 116, which is suspended from the second end 112 of the chain or line 106. The driver D may adjust the force applied by applying his or her weight at any point along the elongate pipe or rod 114, with weight applied closest to the attachment end 116 producing the greatest force. The applied force pulls the chain 106 through the tubular line guide 110, thereby pulling the pull rod 102 and release handle H to unlatch the fifth wheel hitch.

Figure 3:
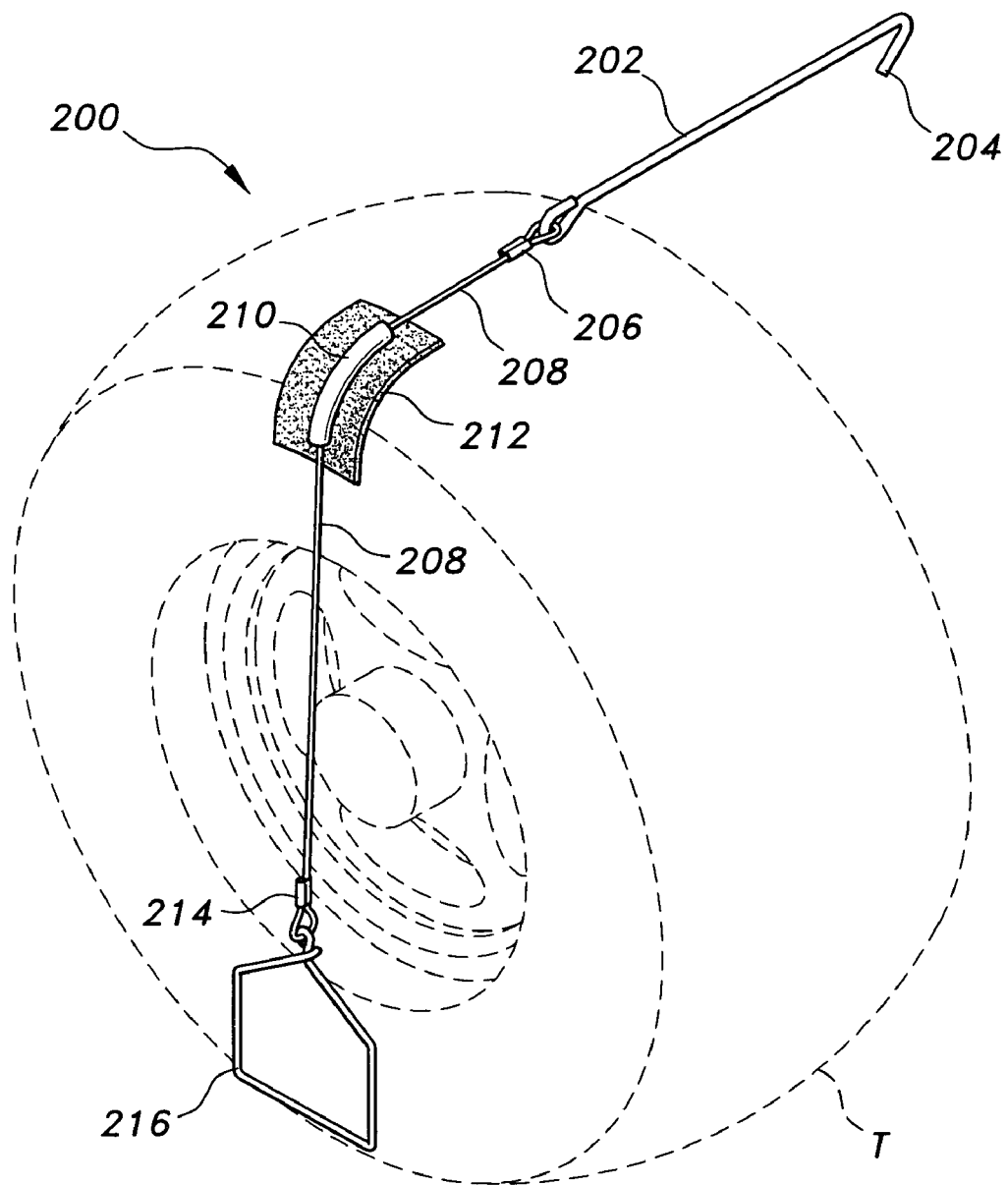
FIG. 3 is a perspective view of yet another alternative embodiment of the present fifth wheel release tool, in which the saddle is formed of a resilient material and the stirrup is formed of a rod.

FIG. 3 is a perspective view of still another embodiment of the present invention, designated as fifth wheel hitch release tool 200. The tool 200 functions in the same manner as that described further above for the tools 10 and 100 respectively of FIGS. 1 and 2. The pull rod 202 is hooked to the hitch release handle (not shown in FIG. 3, but essentially the same as the handle H shown in FIGS. 1 and 2) by means of its distal hitch release engaging hook 204. The opposite end of the pull rod 202 is connected to the first end 206 of a cable 208 by a loop formed in the end of the cable 208 and secured by a Nicopress® sleeve, or other suitable securing means. The medial portion of the line or cable 208 passes through a tubular line guide 210, similar to the tubular guide 110 of the tool 100 illustrated in FIG. 2. The line guide 210 is secured to a saddle 212, which is configured to fit over the outer edge of a tire T (shown in broken lines in FIG. 3), or to conform to some other fixed structure as desired.

The saddle 212 of the tool 200 differs from other saddle elements of other embodiments in that the saddle 212 is formed of a flexible pad of material rather than comprising a rigid bracket, as in the saddle 20 of the tool embodiment 10 of FIG. 1. The line guide 210 may be formed of a length of flexible tube or formed in some other manner or of some other material, as desired. The flexible pad saddle 212 may be advantageous in some operating environments, by providing a greater coefficient of friction between the saddle 212 and underlying structure in order to resist slippage, and by more closely conforming to the underlying structure.

The line 208 continues downwardly from its passage through the line guide 210, terminating in a second end 214 which is connected to a foot actuator 216. The foot actuator 216 is formed of a length of rigid metal rod or the like, bent to form a stirrup-like shape with an attachment eye at its top. The second end 214 of the line 208 (cable, chain, etc.) is secured to the attachment eye of the foot actuator stirrup 216 using any suitable conventional attachment means, some of which have been described further above. It will be noted that the formed wire stirrup foot actuator 216 need not be formed in the shape of a stirrup, but may have any suitable shape as desired. Alternatively, the foot actuator may comprise a loop or band of flexible material, into which one's foot may be inserted to apply force through the tool 200 (or other tool of the present invention) to release the fifth wheel hitch, generally in the manner described further above for the tools 10 and 100 respectively of FIGS. 1 and 2.

Figure 4:
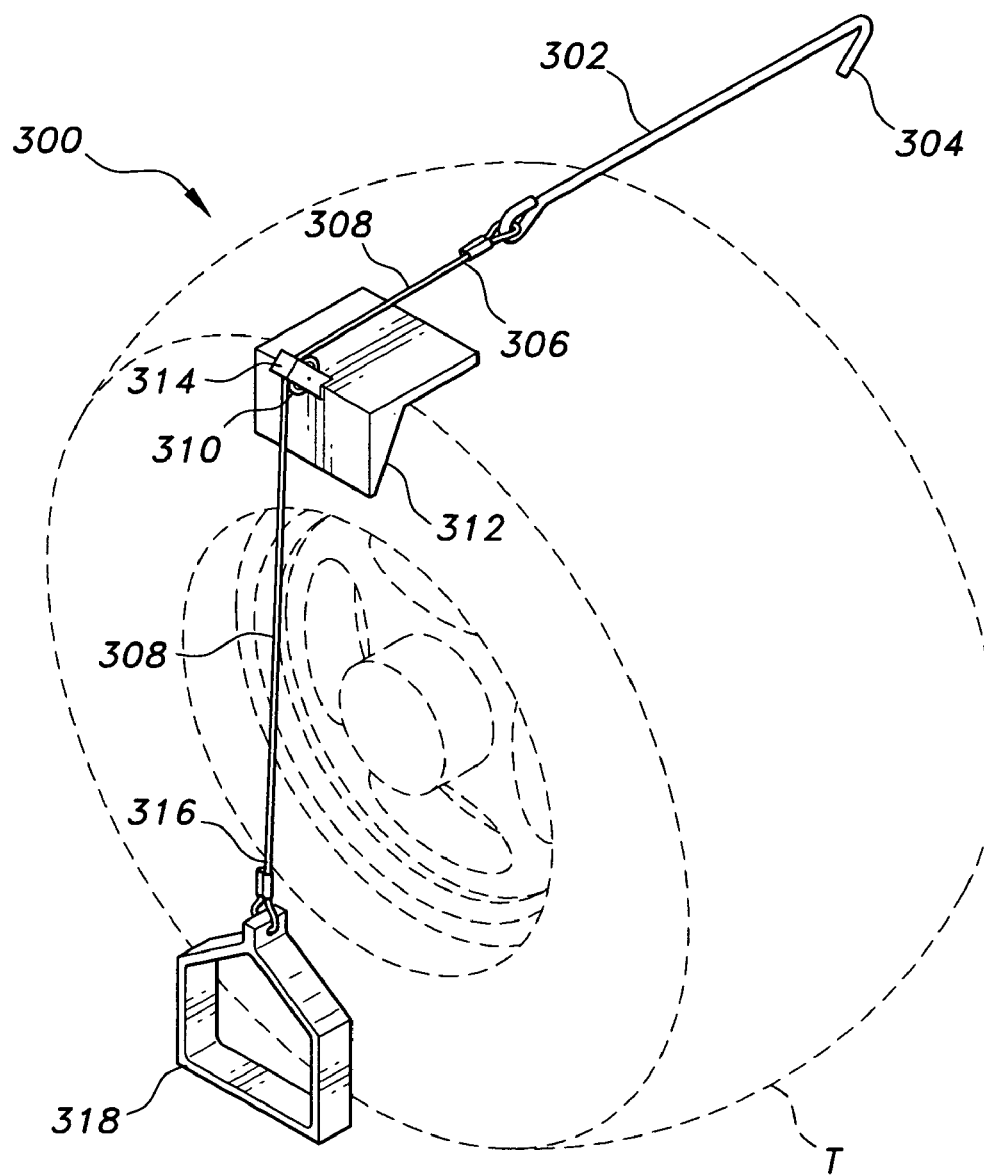
FIG. 4 is a perspective view of still another alternative embodiment of the present tool, in which a pulley is provided at the saddle component.

FIG. 4 discloses a further embodiment, designated as fifth wheel hitch release tool 300. The tool 300 functions in the same manner as that described further above for the tools 10, 100, and 200 respectively of FIGS. 1, 2, and 3. The pull rod 302 is hooked to the hitch release handle (not shown in FIG. 4, but essentially the same as the handle H of FIGS. 1 and 2) by means of its distal hitch release engaging hook 304. The opposite end of the pull rod 302 is connected to the first end 306 of a cable 308 by a loop formed in the end of the cable 308 and secured by a Nicopress® sleeve or other suitable securing means.

The tool 300 of FIG. 4 differs from the other tools of the present invention, in that it includes a pulley 310 secured to the saddle 312 and extending to the outside thereof. The pulley 310 is secured within a guard 314, with the line 308 running over the outside of the pulley 310 between the pulley 310 and the guard 314. This arrangement reduces the friction of the cable or line 308 passing through or over the saddle 312, at the expense of some additional mechanical complication. However, such a pulley 310 installation may be desirable under certain circumstances and in certain operating environments.

The line 308 continues downwardly from its passage over the pulley 310 and through the guard 314, terminating in a second end 316 which is connected to a foot actuator 318. The foot actuator 318 may be in the form of a stirrup, essentially identical to the stirrup actuator 26 of the tool 10 of FIG. 1, or may alternatively be in the form of any of the other actuators (e.g. the pipe or rod 114 of the tool 100 of FIG. 2, or the formed rod 216 of the tool 200 of FIG. 3, etc.). The tool 300 functions in the same manner as the tools 10, 100, and 200 respectively of FIGS. 1, 2, and 3 discussed further above. The pull rod 302 is hooked to the release handle (e.g. the handle H shown in FIGS. 1 and 2), and the saddle 312 is placed on the outer edge of the tire T (or other suitable fixed structure) with the medial portion of the line 308 passing over the pulley 310. The stirrup 318 suspended from the second end 316 of the line 308 is used for applying the required force to pull the hitch release handle, just as in the other release tools of the present invention.

Figure 5:
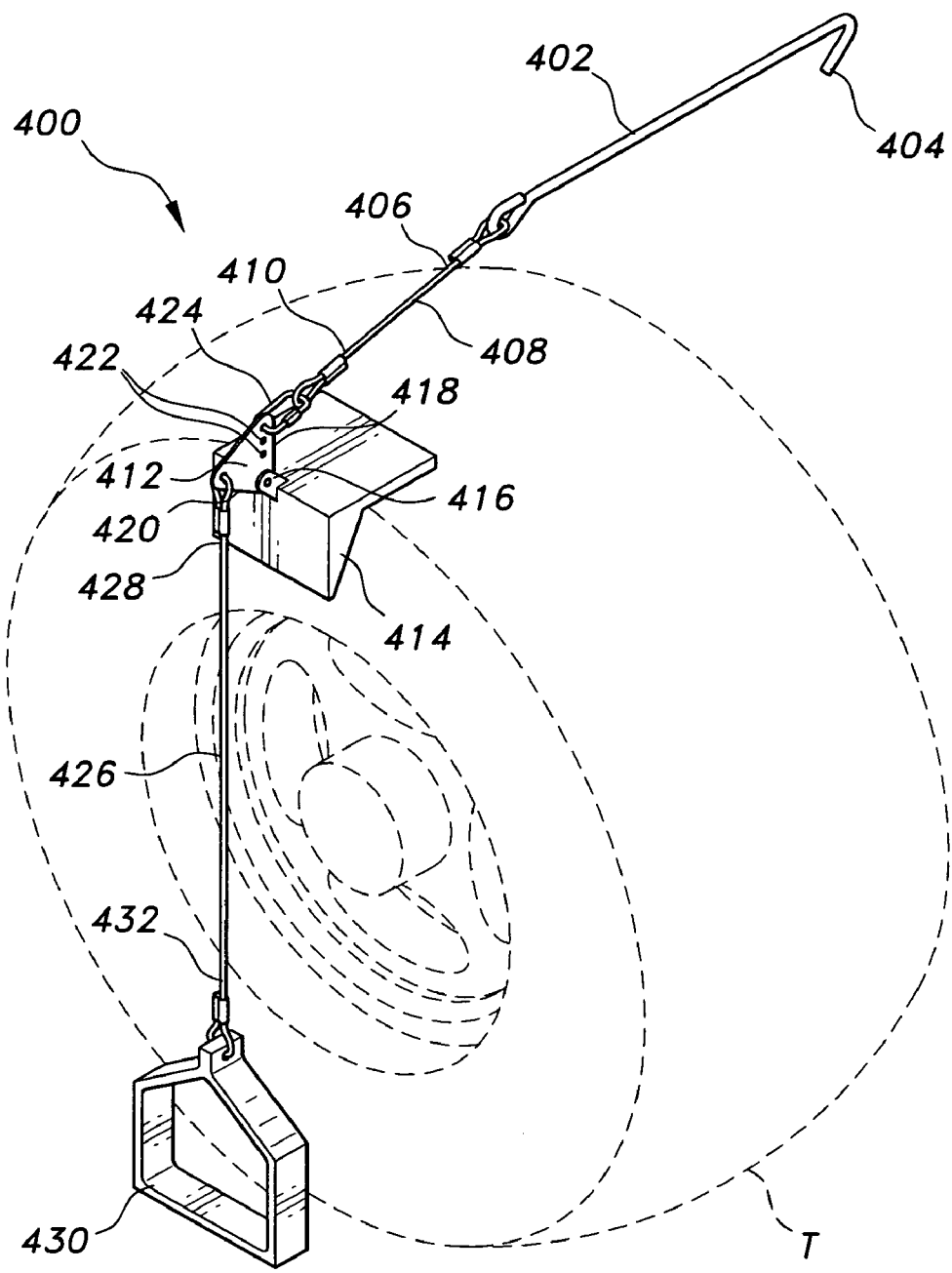
FIG. 5 is a perspective view of a further alternative embodiment of the present tool, in which an adjustable bellcrank is provided at the saddle component.

FIG. 5 discloses an additional embodiment, designated as fifth wheel hitch release tool 400. The tool 400 functions in the same manner as that described further above for the tools 10, 100, 200, and 300, respectively of FIGS. 1 through 4, but differs by means of the mechanism for converting the direction of motion of the pulling line of the device. The pull rod 402 is hooked to the hitch release handle (not shown in FIG. 5, but essentially the same as the handle H shown in FIGS. 1 and 2) by means of its distal hitch release engaging hook 404. The opposite end of the pull rod 402 is connected to the first end 406 of a first rigid rod 408 by an eye formed in the first end 406 of the rod 408. Alternatively, the pull rod 402 and first rod 408 may comprise a single rigid component, if so desired.

The second end 410 of the first rigid rod 402 is connected to a bellcrank 412, which is secured to the saddle 414 by a pivot 416. The bellcrank 412 includes opposed first and second arms, respectively 418 and 420, which may comprise opposed sides of a triangular bellcrank configuration, generally as shown. The first arm 418 of the bellcrank 412 may include a series of adjustment holes 422 therethrough, if desired. These holes 422 allow the position of the second end 410 of the first rod 408 to be adjusted relative to the fulcrum pivot 416 of the bellcrank 412, thereby adjusting the amount of force required to operate the present release tool 400. The second end 410 of the first rod or line 408 may be adjustably secured to the first arm 418 of the bellcrank 412 by means of an openable link 424, or other conventional adjustable connecting means as desired.

A separate, second rigid rod or line 426 has a first end 428 connected to the end of the second arm 420 of the bellcrank 412, and drops downwardly from the bellcrank 412 to connect to the foot actuator stirrup 430 at its second end 432. It will be seen that as the two pulling lines or rods 408 and 426 do not comprise a single continuous component passing over the saddle 414, they need not be flexible in order to negotiate the curve over the saddle 414. Thus, the two lines 408 and 426 may be in the form of rigid rods, if so desired, although the flexible cables, chains, etc. described for use in the other embodiments of the present invention, discussed further above, may be used in the tool 400 embodiment of FIG. 5, if so desired.

The foot actuator 430 may be in the form of a stirrup, essentially identical to the stirrup actuator 26 of the tool 10 of FIG. 1, or may alternatively be in the form of any of the other actuators (e.g. the pipe or rod 110 of the tool 100 of FIG. 2, or the formed rod 216 of the tool 200 of FIG. 3, etc.). The tool 400 functions in the same manner as the tools 10, 100, 200, and 200 respectively of FIGS. 1, 2, 3, and 4 discussed further above. The pull rod 402 is hooked to the release handle (e.g. the handle H shown in FIGS. 1 and 2), and the saddle 414 is placed on the outer edge of the tire T (or other suitable fixed structure). The stirrup 430 suspended from the second end 432 of the second rod or line 426 is used for applying the required force to pull the release handle of the hitch mechanism by means of the second rod 426 acting through the bellcrank 412 to transfer the force to the first rod 408 and pull rod 402.

In conclusion, the present fifth wheel hitch release tool in its various embodiments enables a trucker or other person to release the latch mechanism of a fifth wheel trailer hitch without undue exertion or risk of back strain or other injury. The present release tool may comprise any of a number of embodiments, and may make use of virtually any type of flexible, non-resilient line, chain, or other material having similar properties. The component provided for changing the direction of the applied tensile force may have any of a number of different configurations as desired, and may be formed of rigid or flexible materials as desired. The device may provide nothing more than a simple channel, tube, or other passage as a line guide, or may include a pulley, bellcrank, gearing, or other mechanism to accomplish the directional change for the tensile line.

Where a bellcrank or similar mechanism is used, the horizontal and vertical portions of the line are two separate components, and may be formed of rigid materials as they do not need to negotiate the bend over the saddle portion of the device. The foot actuator may also be formed in a number of different configurations, from a stirrup structure to a flexible loop, or may even comprise a rigid pipe or rod having one end suspended from the tensile line with the opposite end resting upon the underlying surface. Means for adjusting the length of the line and/or providing and adjusting the mechanical advantage of the device, may also be provided.

Regardless of the specific embodiment and structure of the hitch release tool of the present invention, the basic principle of operation remains the same. The substantially horizontal force required for releasing a fifth wheel hitch is provide by a downward vertical force, which is transferred to the horizontal and applied to the hitch release handle to pull the handle outwardly for releasing the hitch. The downward vertical force is imparted to the stirrup or other foot actuator, enabling the driver or other person to merely place his or her weight on or in the foot actuator to provide the required release force.

Thus, the person using the present tool need not exert his or her upper body or back and risk back injury, as is the case when operating conventional hitch release tools which require a horizontal pull. Even the smallest persons are capable of applying over one hundred pounds of force using the present tool, merely by stepping on a foot actuator and applying their weight thereto. The present tool thus provides a much needed solution for trucking industry compliance to OSHA guidelines, regulations, and recommended practices by eliminating the risk of back or upper body injury, as often occurs with conventional fifth wheel hitch release tools and devices. The present hitch release tool will thus prove to be an extremely popular device for over-the-road truckers and others who wish to facilitate the task of releasing semi-trailer hitches, without risk of personal injury.

It is to be understood that the present invention is not limited to the embodiments described above, but encompasses any and all embodiments within the scope of the following claims.

We claim:

1. A fifth wheel release tool for removable attachment to a hitch release handle extending from a fifth wheel hitch mechanism of a truck tractor, said tool comprising:
   a flexible, non-resilient line having a first end and a second end opposite said first end;
   a hitch release engaging hook extending from said first end of said line;
   a foot actuator extending from said second end of said line;
   a saddle disposed generally medially along said line; and
   a line guide disposed upon said saddle and retaining said line movably across said saddle;
   whereby, when said hitch release engaging hook is removably secured to the hitch release handle of the fifth wheel hitch mechanism, said saddle is removably placed upon a fixed structure, said foot actuator is suspended above an underlying surface and generally below said saddle, and a user places his or her foot upon said foot actuator and applies his or her weight thereto, a tensile force is produced from said second end of said line across said saddle to said first end of said line and to said hitch release engaging hook for pulling the hitch release handle, thereby releasing the hitch.

2. The fifth wheel release tool according to claim 1, wherein said line is selected from the group consisting of flexible cables and chains.

3. The fifth wheel release tool according to claim 1, wherein said line is adjustable in length.

4. The fifth wheel release tool according to claim 1, wherein said foot actuator is selected from the group consisting of stirrups, rigid pipes, and rigid rods.

5. The fifth wheel release tool according to claim 1, wherein said saddle is selected from the group consisting of rigid brackets and flexible pads.

6. The fifth wheel release tool according to claim 1, wherein said line guide is selected from the group consisting of a passage formed through said saddle, a tube disposed over said saddle, and a pulley affixed to and extending from said saddle.

7. A fifth wheel release tool for removable attachment to a hitch release handle extending from a fifth wheel hitch mechanism of a truck tractor, said tool comprising:
   a flexible, non-resilient line having a first end and a second end opposite said first end;
   a hitch release engaging hook extending from said first end of said line;
   a foot actuator extending from said second end of said line;
   an elongate crossmember disposed generally medially beneath said line; and
   a line guide disposed upon said crossmember and retaining said line movably across said crossmember;
   whereby, when said hitch release engaging hook is removably secured to the hitch release handle of the fifth wheel hitch mechanism, said crossmember is removably placed across a fixed structure, said foot actuator is suspended above an underlying surface and generally below said crossmember, and a user places his or her foot upon said foot actuator and applies his or her weight thereto, a tensile force is produced from said second end of said line across said crossmember to said first end of said line and to said hitch release engaging hook for pulling the hitch release handle, thereby releasing the hitch.

8. The fifth wheel release tool according to claim 7, wherein said line is selected from the group consisting of flexible cables and chains.

9. The fifth wheel release tool according to claim 7, wherein said line is adjustable in length.

10. The fifth wheel release tool according to claim 7, wherein said foot actuator is selected from the group consisting of stirrups, rigid pipes, and rigid rods.

11. The fifth wheel release tool according to claim 7, wherein said crossmember comprises a rigid member having a generally L-shaped cross section.

12. The fifth wheel release tool according to claim 1, wherein said line guide is selected from the group consisting of a passage formed through said crossmember, a tube disposed over said crossmember, and a pulley affixed to and extending from said crossmember.

13. A fifth wheel release tool for removable attachment to a hitch release handle extending from a fifth wheel hitch mechanism of a truck tractor, said tool comprising:
　a first and a second non-resilient line, each having a first end and a second end opposite said first end;
　a hitch release engaging hook extending from said first end of said first line;
　a foot actuator extending from said second end of said second line;
　a saddle disposed between said first line and said second line; and
　a bellcrank pivotally disposed upon said saddle, and having:
　　a first attachment arm pivotally secured to said second end of said first line; and
　　a second attachment arm pivotally secured to said first end of said second line;
　whereby, when said hitch release engaging hook is removably secured to the hitch release handle of the fifth wheel hitch mechanism, said saddle is removably placed upon a fixed structure, said foot actuator is suspended above an underlying surface and generally below said saddle, and a user places his or her foot upon said foot actuator and applies his or her weight thereto, a tensile force is produced from said second end of said second line across said bellcrank of said saddle to said first end of said first line and to said hitch release engaging hook for pulling the hitch release handle, thereby releasing the hitch.

14. The fifth wheel release tool according to claim 13, wherein each said line is selected from the group consisting of rigid rods, flexible cables, and chains.

15. The fifth wheel release tool according to claim 13, wherein at least one said line is adjustable in length.

16. The fifth wheel release tool according to claim 13, wherein said first line is adjustably secured to said bellcrank.

17. The fifth wheel release tool according to claim 13, wherein said foot actuator is selected from the group consisting of stirrups, rigid pipes, and rigid rods.

18. The fifth wheel release tool according to claim 13, wherein said saddle is selected from the group consisting of rigid brackets and flexible pads.

19. The fifth wheel release tool according to claim 13, wherein said line guide is selected from the group consisting of a passage formed through said saddle, a tube disposed over said saddle, and a pulley affixed to and extending from said saddle.

* * * * *